United States Patent [19]

Gavagan

[11] Patent Number: 4,707,018

[45] Date of Patent: Nov. 17, 1987

[54] FREE STANDING SUNSHADE ASSEMBLY

[75] Inventor: James A. Gavagan, Center Line, Mich.

[73] Assignee: Irvin Industries, Inc., Rochester Hills, Mich.

[21] Appl. No.: 827,455

[22] Filed: Feb. 7, 1986

[51] Int. Cl.[4] .............................................. B60J 3/02
[52] U.S. Cl. ................................ 296/976; 160/23 R; 160/DIG. 3
[58] Field of Search .................. 296/97 G, 97 R, 97 F, 296/98; 160/23 R, 314, DIG. 2, 402, DIG. 3, 403; 269/268; 24/563; 33/138

[56] References Cited

U.S. PATENT DOCUMENTS

| 322,222 | 7/1885 | Waters | 269/268 |
|---|---|---|---|
| 1,844,599 | 2/1932 | Renzetti | 160/314 |
| 1,932,475 | 10/1933 | Peteler | 296/97 G |
| 2,036,720 | 4/1936 | Ritter | 33/138 |
| 2,874,770 | 2/1959 | Rohr et al. | 296/97 G |
| 3,774,309 | 11/1973 | Leopoldi | 33/138 |
| 4,429,462 | 2/1984 | Rutty et al. | 33/138 |
| 4,603,481 | 8/1986 | Cohen et al. | 33/138 |

FOREIGN PATENT DOCUMENTS 1143412  3/1983  Canada ................................. 296/98

Primary Examiner—Dennis H. Pedder
Attorney, Agent, or Firm—Harness, Dickey & Pierce

[57] ABSTRACT

A free standing sunshade assembly particularly adapted to be attached to a motor vehicle which enables a shade member to be retracted or extended in accordance with the needs of the motor vehicle operator. The shade includes a shade housing having an internal sunshade roller which stores the shade material. The shade is positioned and maintained in a desired extended or retracted position through the use of an elongated stiffener tape member having a crowned cross-sectional shape which provides bending stiffness. The stiffener tape is stored by coiling within a stiffener tape housing and is extended and retracted along with the shade material.

13 Claims, 7 Drawing Figures

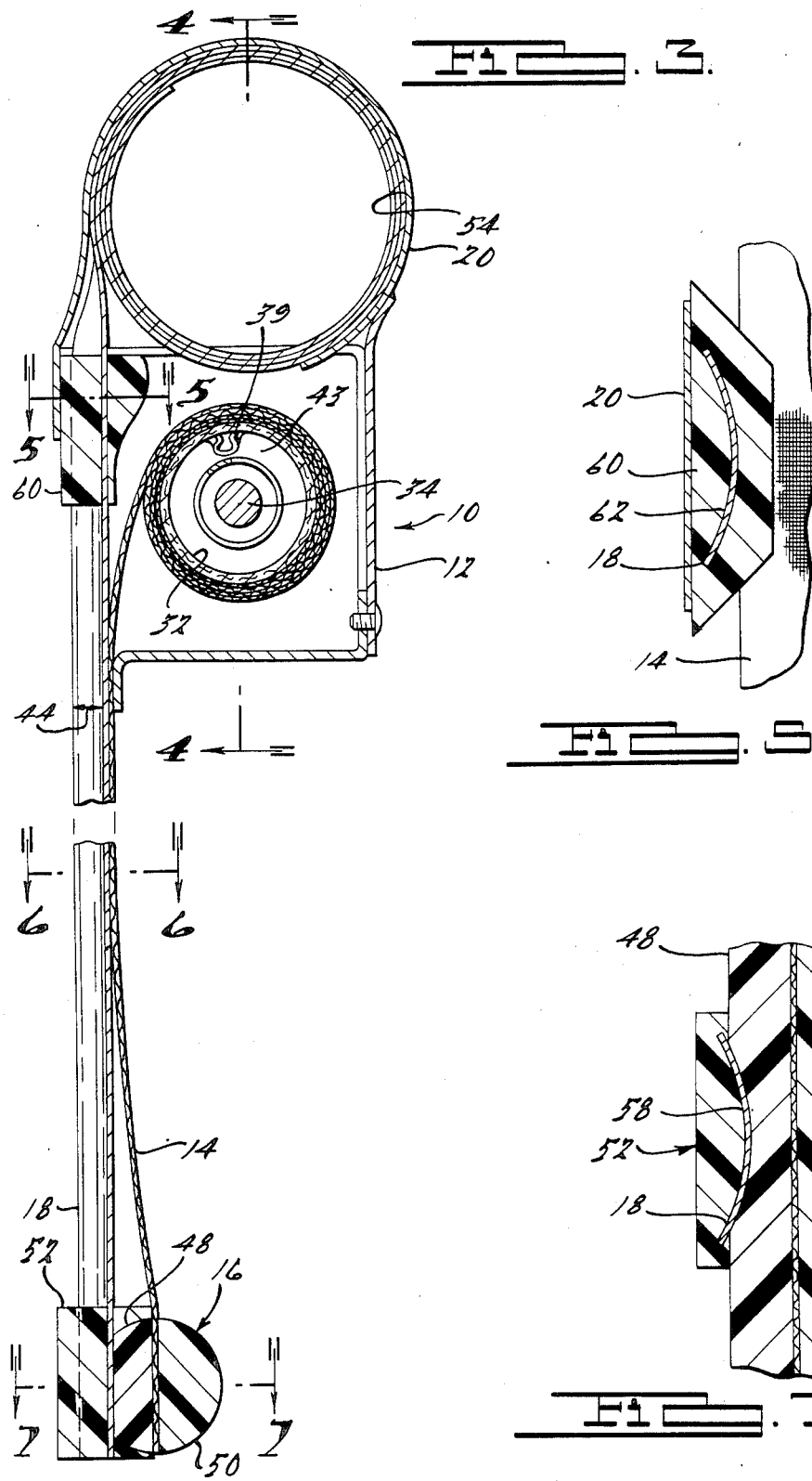

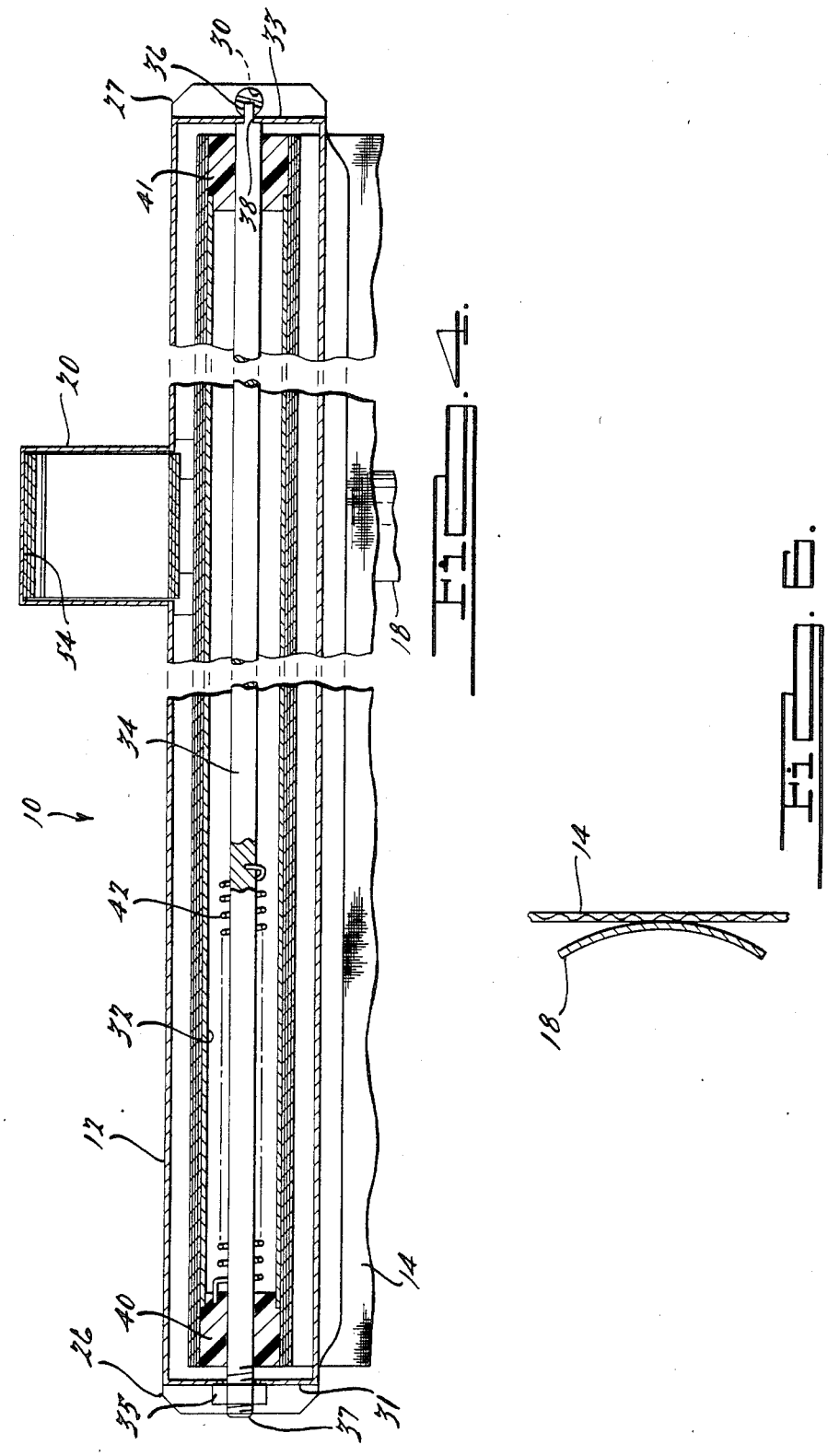

FREE STANDING SUNSHADE ASSEMBLY

BACKGROUND OF THE INVENTION

This invention relates to a retractable sunshade assembly and particularly to one adapted to be mounted to a motor vehicle.

In certain driving conditions, operators of motor vehicles are subjected to glare from the sun or other strong light sources. Such glare is an annoyance which can contribute to fatigue, and further, constitutes a safety threat if it interferes with the operator's vision of traffic or the roadway. In addition to the potential for visual impairment, direct sunlight rays can cause the interior of the vehicle to become uncomfortably warm. These problems presented by sunlight and glare become particularly acute for operators of heavy-duty trucks or other commercial vehicles who often drive long distances. In an effort to alleviate the above-mentioned problems, it is presently known to equip motor vehicles with retractable sunshades which may be mounted adjacent the backlite or side door window openings which enable the operator to extend the shade to provide a light shielding effect. Such shades may be made from transparent tinted films, opaque sheets, screen type materials, etc. Since there are operating conditions in which the driver would not desire a shade member to be present, for example, night driving conditions, such sunshades are typically retractable. In addition to the foregoing, sunshade devices further enable the vehicle operator to obscure valuable within the vehicle to avoid tempting thieves when the vehicle is unattended.

Although retractable sunshades are presently known for motor vehicles, those presently available suffer the disadvantage that substantial vehicle modifications or complex mounting provisions are ordinarily required in order to mount the shade assembly to the vehicle. Additionally, it is further typically necessary to configure the shade within close tolerances of the window area to be covered. Such requirements of complicated mounting provisions and precise width and length dimensions have led to substantial costs both in terms of piece price and installation labor requirements.

In accordance with this invention, a retractable sunshade structure is provided which overcomes the above-described shortcomings of units according to the prior art. The sunshade assembly according to this invention is easily mounted to the vehicle. This ease of mounting is principally achieved by incorporating an integral reinforcement member which supports the shade member at any extended position which enables the shade to be free standing. The sunshade assembly according to this invention is further uncomplicated in design and could be inexpensively produced.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 3 is a cross-sectional view taken along line 3—3 of FIG. 1 showing internal components of the free standing sunshade assembly according to this invention;

FIG. 4 is a cross-sectional view taken along line 4—4 of FIG. 3;

FIG. 5 is a cross-sectional view taken along line 5—5 of FIG. 3;

FIG. 6 is a cross-sectional view taken along line 6—6 of FIG. 3; and

FIG. 7 is a cross-sectional view taken along line 7—7 of FIG. 3.

DETAILED DESCRIPTION OF THE INVENTION

Figure 1:
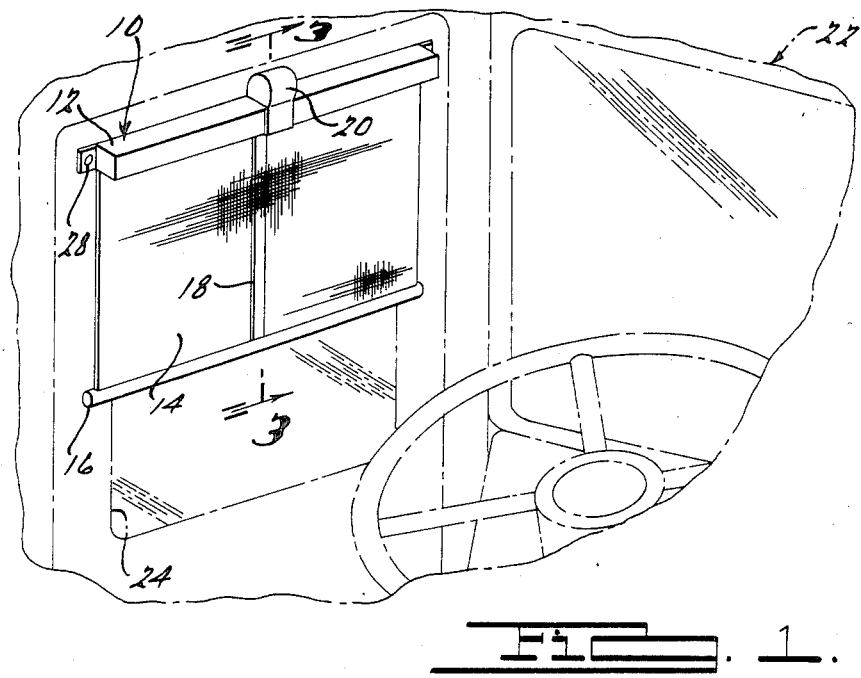
FIG. 1 is a pictorial view from the inside of a heavy-duty truck showing one mounting orientation for a free standing sunshade assembly in accordance with this invention.

A free standing sunshade assembly according to this invention is described with reference to each of the Figures and is generally designated by reference number 10. Free standing sunshade assembly 10 principally comprises: shade housing 12, shade member 14, support rod 16, stiffener tape 18 and stiffener tape housing 20.

Figure 2:
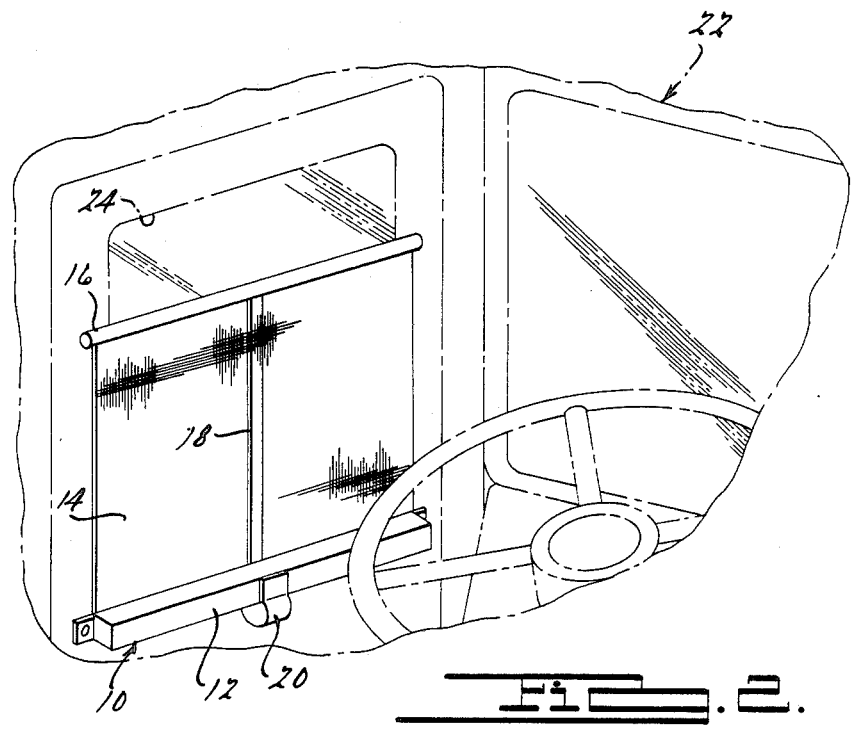
FIG. 2 is a pictorial view from the inside of a heavy-duty truck showing a free standing sunshade assembly according to this invention mounted in an orientation inverted from that shown in FIG. 1.

Sunshade assembly 10 is shown mounted within motor vehicle 22 (shown as a heavy-duty truck) in FIGS. 1 and 2 to provide a retractable glare shield for window opening 24. The simplicity with which sunshade assembly 10 may be mounted to a vehicle is evident with reference to those Figures. Sunshade assembly 10 is shown in FIG. 1 mounted by attachment of shade housing 12 along the uppermost perimeter edge of window opening 24. For this application, the operator pulls downwardly on support rod 16 to extend shade member 14 to the desired position. The application of sunshade assembly 10 shown in FIG. 2 illustrates that shade housing 12 can alternately be attached along the lower perimeter edge of window opening 24 and extended in an upward direction. In either application, free standing sunshade assembly 10 may be attached to motor vehicle 22 merely by fastening shade housing 12 to the vehicle. No additional mounting provisions are necessary. Due to this simplified mounting capability, sunshade assembly 10 can be conveniently attached to existing motor vehicles of various designs and configurations. The length and width dimensions of shade member 14 are non-critical since the shade can be extended to whatever length is desired and the design does not require side guide rails or other mounting components which would dictate the width of the shade. A description of the configuration of the components and their cooperation which provide the above-mentioned capabilities is provided below with specific reference to FIGS. 3 through 7.

Shade housing 12 is an elongated rectangular box-shaped housing having one or more mounting flanges 26 and 27 extending from opposing end surfaces 31 and 33. Mounting flanges 26 and 27 preferably include fastener holes 28 and 30, enabling shade housing 12 to be attached to a motor vehicle using threaded fasteners, rivets, etc. Shade housing 12 retains shade roller 32 which is an elongated cylindrical member mounted for rotation on roller shaft 34. Roller shaft 34 is attached to shade housing 12 such that it does not rotate relative to the housing. In a preferred embodiment, one end of roller shaft 34 has a flattened end 36 which fits into a complementary shaped hole 38 in end surface 31 or 33 of housing 12. Roller shaft 34 is axially restrained by nut 35 on threaded shaft end 37. Bearing members 40 and 41 are provided at opposing ends of roller 32 which serve to locate the roller concentrically around roller shaft 34. Shade roller 32 may be formed to define an elongated hollow channel 39 which is provided to enable attachment of shade member 14. Bearing members 40 and 41 define channels 43 conformed to provide clearance for channel 39 and also cause the bearing members to rotate with shade roller 32. Torsion spring 42 has one end affixed to roller shaft 34 and another end coupled to shade roller 32 through engagement with bearing 40 or directly to the roller such that rotation of the roller develops a torsional force on the roller. This rotational biasing exerts a retraction force on shade member 14.

Numerous alternate configurations of shade roller 32 may be employed in practicing the present invention. For example, the roller could be formed by two half cylindrical sections which are clamped together along an edge of shade member 14.

Shade member 14 may be made of any desired material such as opaque, semi-transparent tinted films, mesh-type glare screen materials, etc. One edge of shade member 14 is affixed to shade roller 32 preferably by engagement with channel 39. Shade 14 passes through an elongated gap 44 defined by shade housing 12. The edge of shade 14 opposite the edge affixed to shade roller 32 is preferably reinforced and stiffened by support rod 16. As shown in FIG. 3, support rod 16 may be comprised of two half cylindrical rod sections 48 and 50 which are clamped together against shade 14. Roller torsion spring 42 is preloaded in a manner such that support rod 16 is urged toward abutting contact with shade housing 12.

The free standing feature of sunshade assembly 10 is primarily achieved through use of stiffener tape 18 which serves the two-fold function of positioning support rod 16 and shade 14, and further, providing a restraining force against the force of retraction exerted by shade roller 32 thereby enabling the shade to be maintained at a desired extended position. Stiffener tape 18 is preferably an elongated metal tape having an arcuate cross-sectional shape or crown as shown in Figure 6. Tape 18 is formed such that, absent externally applied loads, the tape tends to maintain the crown shape. This crown is much like that which is frequently provided in the metal tapes of retractable tape measuring devices of the type often used by carpenters and home owners. The crown of stiffener tape 18 provides a degree of stiffness which resists bending of the tape. Stiffener tape 18 has one end affixed to support rod 16 by stiffener tape attaching block 52 best shown with reference to FIG. 7. Attaching block 52 is clamped against support rod section 48 and cooperates with support rod section 48 to define an arcuate shaped cavity 58. Cavity 58 insures that the end of stiffener tape 18 is maintained in the desired crowned shape, thereby providing the previously mentioned stiffening characteristic. Attaching block 52 may be affixed to support rod 16 by any conventional means. Stiffener tape guide 60 is mounted to shade housing 12 and/or stiffener tape housing 20 and is best shown in FIGS. 3 and 5. Stiffener tape guide 60, like attaching block 52, defines an arcuate shape cavity 62 which also insures that stiffener tape 18 maintains the desired arcuate cross-sectional shape.

Stiffener tape housing 20 is affixed to shade housing 12 and defines an internal cylindrical surface 54 which enables tape 18 to be stored by causing the tape to become coiled onto itself when it is retracted. The crowned cross-sectional shape of stiffener tape 18 is substantially removed once the tape is forced to be bent and conform to inside cylindrical surface 52 of stiffener tape housing 20. Tape 18, although fairly stiff when it maintains the crown shape and extends in a straight line, becomes easily bent and can therefore be coiled when the crown shape is removed. The interaction between stiffener tape housing 20 and tape 18 provides sufficient friction to oppose the retraction force exerted by torsion spring 42 to maintain support rod 16 at a desired extended position. Such frictional engagement is provided since the normally uncoiled shape of stiffener tape 18 provides a radially outward uncoiling force against stiffener tape housing 20 and against adjacent coils of the tape when it is retracted within the housing. Additional friction is provided by the interaction between tape 18 and tape guide 60.

In operation, sunshade assembly 10 may be mounted in any manner including those shown in FIGS. 1 and 2. When shade member 14 is in its retracted position, the shade is stored on shade roller 32 and stiffener tape 18 is coiled onto itself within stiffener tape housing 20. When it is desired to extend shade member 14, support rod 16 is grasped by the user and pulled to an extended position. This action causes shade 14 to be unrolled from roller 32 and simultaneously causes stiffener tape 18 to be uncoiled from housing 20. As tape 18 is withdrawn from housing 20, it is forced to assume its crowned shape by the forming action of tape guide cavity 62. This forming action provided by tape guide 60 and attaching block 52 combine to enable tape 18 to behave like a rigid member. Since shade member 14 is restrained by stiffener tape 18 and not by external mounting provisions, sunshade assembly 10 may be mounted merely by affixing shade housing 12 to the associated motor vehicle structure.

While the above description constitutes the preferred embodiments of the present invention, it will be appreciated that the invention is susceptible to modification, variation and change without departing from the proper scope and fair meaning of the accompanying claims.

What is claimed is:

1. A free standing sunshade assembly adapted to be mounted to a motor vehicle, comprising:
    a retractable shade member,
    shade housing means for supporting said shade member relative to said motor vehicle,
    a stiffener tape coupled with said shade member for positioning said shade member, said stiffener tape being conformable to an arcuate cross-sectional shape,
    a stiffener tape housing for storing said tape, said stiffener tape disposed in said stiffener tape housing and separately coiled and displaced from the shade member therein such that said tape may be extended from and retracted into said stiffener tape housing, and
    a stiffener tape guide mounted adjacent said stiffener tape housing and defining an arcuate-shaped groove which conforms said stiffener tape to said arcuate shape as said stiffener tape is withdrawn from said housing.

2. The free standing sunshade assembly according to claim 1 further comprising a shade roller wherein said shade member is attached to said roller along one edge thereof.

3. The free standing sunshade assembly according to claim 2 further comprising torsion spring means for exerting a torsional force upon said shade roller, thereby biasing said shade member to a retracted position.

4. The free standing sunshade assembly according to claim 2 wherein said shade housing encloses said shade roller.

5. The free standing sunshade assembly according to claim 1 wherein said stiffener tape housing is affixed to said shade housing.

6. The free standing sunshade assembly according to claim 1 further comprising a support rod affixed to one edge of said shade member and wherein said stiffener tape is coupled to said rod.

7. The free standing sunshade assembly according to claim 1 further comprising a support rod affixed to one edge of said shade member and wherein said stiffener tape is attached to said rod through clamping engagement between an attaching block and said rod, said attaching block and said rod cooperating to define an arcuate shaped groove which conforms said stiffener tape to said arcuate shape.

8. A free standing sunshade assembly adapted to be mounted to a motor vehicle, comprising:
   a retractable shade member,
   shade housing means for supporting said shade member relative to said motor vehicle,
   a support rod affixed to one edge of said shade member,
   an elongated stiffener tape being conformable to an arcuate cross-sectional shape and having an end coupled to said support rod,
   stiffener tape attaching means for attaching said stiffener tape to said support rod, said attaching means further coupled with said support rod for defining an arcuate-shaped groove for conforming said stiffener tape to said arcuate shape,
   a stiffener tape housing having an internal cylindrical surface, said stiffener tape becoming separately coiled within said stiffener tape housing and displaced from the rolled shade member when said shade member is retracted, said stiffener tape being withdrawn from said stiffener tape housing when said shade member is extended, said stiffener tape acting to support said rod member to maintain said shade member at a desired extended position, and
   a stiffener tape guide mounted adjacent said stiffener tape housing and defining an arcuate-shaped groove which conforms said stiffener tape to said arcuate shape as said stiffener tape is withdrawn from said housing.

9. The free standing sunshade assembly according to claim 8 further comprising a shade roller, said shade member attached to said roller along one edge thereof.

10. The free standing sunshade assembly according to claim 8 further comprising torsion spring means for exerting a torsional force upon said shade roller, thereby biasing said shade member to a retracted position.

11. The free standing sunshade assembly according to claim 9 wherein said shade housing encloses said shade roller.

12. The free standing sunshade assembly according to claim 8 wherein said stiffener tape housing is affixed to said shade housing.

13. A free standing sunshade assembly adapted to be mounted to a motor vehicle, comprising:
   a shade housing adapted to be affixed to said motor vehicle,
   a rotatable shade roller disposed in said shade housing,
   a shade member affixed along a first edge to said shade roller,
   torsion spring means for providing a biasing force on said shade roller such that said shade member is biased to be rolled onto said roller and retained within said shade housing,
   a support rod affixed to said shade along a second edge opposite said first edge,
   a stiffener tape being conformable to an arcuate cross-sectional shape and having an end coupled to said support rod,
   stiffener tape attaching means for attaching said stiffener tape to said support rod, said attaching means further coupled with said support rod for defining an arcuate-shaped groove for conforming said stiffener tape to said arcuate shape,
   a stiffener tape housing attached to said shade housing and having an internal cylindrical surface, said stiffener tape becoming separately coiled within said stiffener tape housing and displaced from the rolled shade member when said shade is retracted and becoming withdrawn from said stiffener tape housing when said shade member is extended, said stiffener tape acting to support said support rod to maintain said shade member at a desired extended position, and
   a stiffener tape guide mounted adjacent said stiffener tape housing defining an arcuate groove for guiding said stiffener tape and conforming said stiffener tape to said arcuate shape.

* * * * *